3,385,785
METHOD OF CONTROLLING PHOSPHATE CONCENTRATION IN SEWAGE TREATMENT SYSTEMS
Tom H. Forrest, Evanston, Ill., and Devere W. Ryckman, Glendale, Edward Edgerley, Jr., Kirkwood, and Bernard A. Rains, University City, Mo., assignors to FMC Corporation, a corporation of Delaware
Filed May 4, 1966, Ser. No. 547,496
10 Claims. (Cl. 210—6)

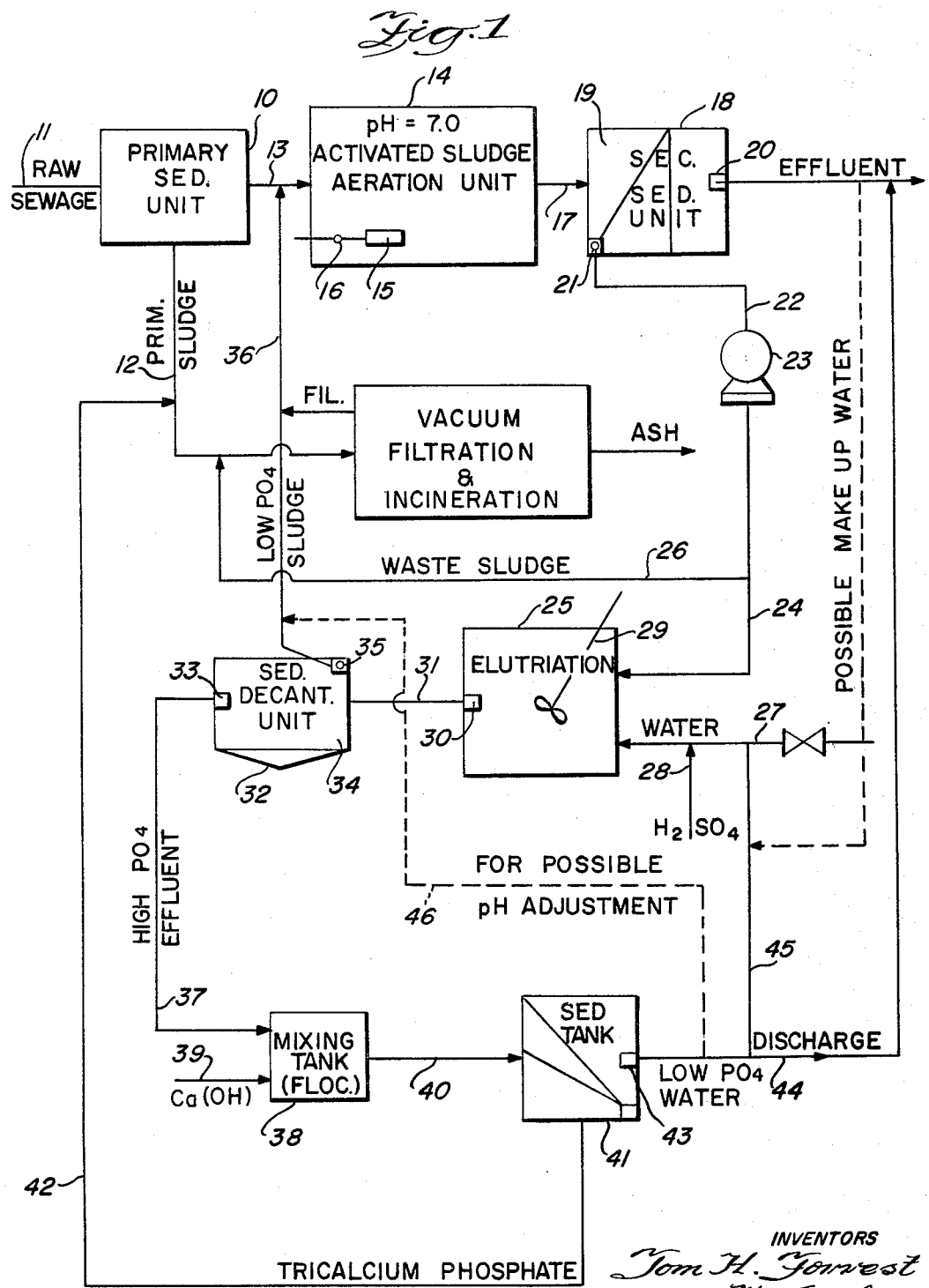

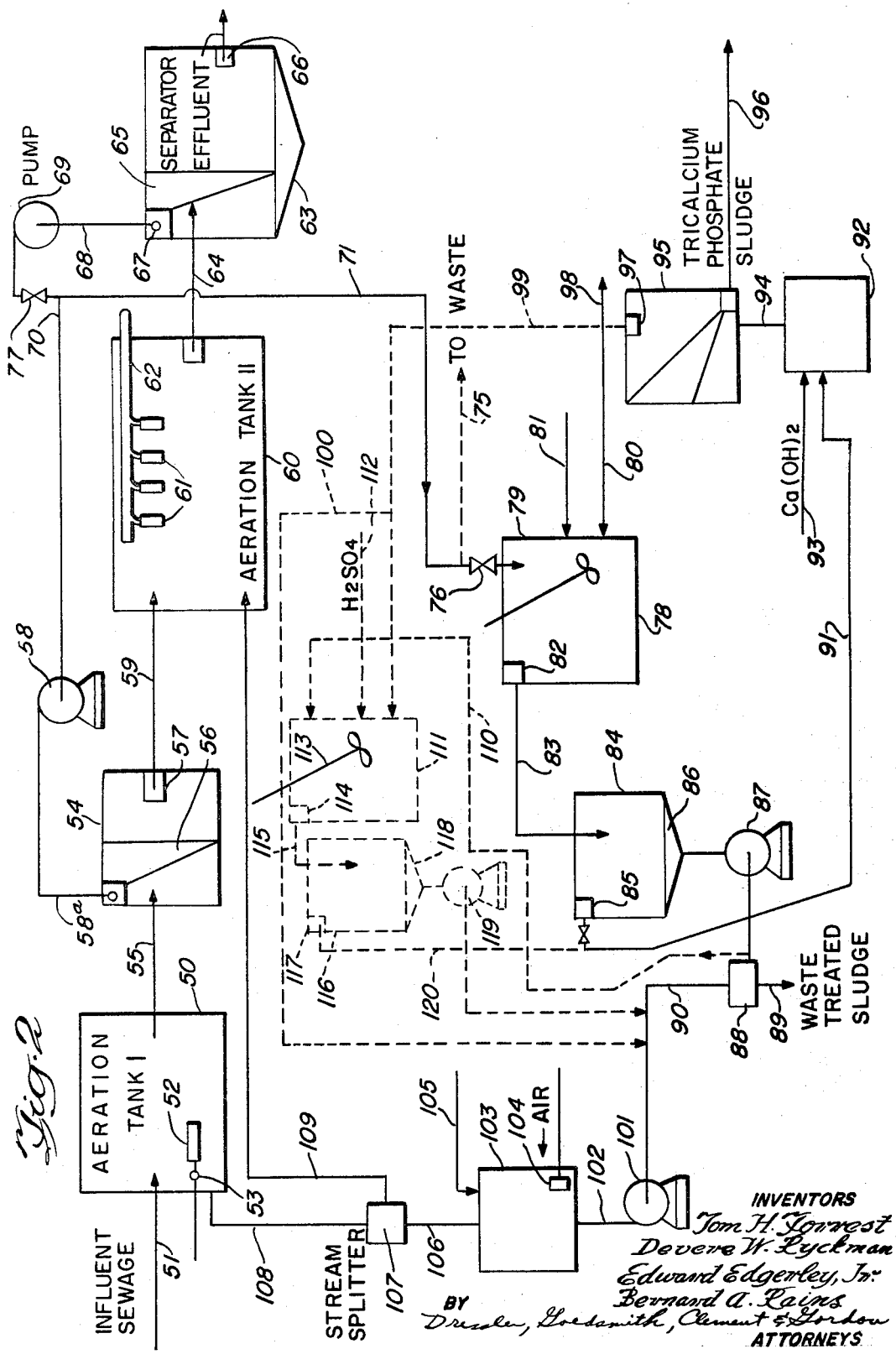

ABSTRACT OF THE DISCLOSURE

The process of this invention deals with the treatment of sewage to produce an effluent having a low biochemical oxygen demand and a markedly reduced content of nutrients such as phosphorus compounds. In the illustrative embodiment, a mixed liquor formed from phosphorus-containing influent sewage and a phosphate-depleted sludge and having a solids concentrataion of a minimum of 60 pounds of solids per pound of phosphate in the sewage being converted to mixed liquor, is aerated for from 1 to 2 hours. The aerated mixed liquor is withdrawn from the aeration tank and separated into a low phosphate content aqueous medium for discharge from the system and a phosphate-containing sludge concentrate. The sludge concentrate is adjusted in pH to between 3.5 and 6 and elutriated with water to wash out the phosphates. The low phosphate content sludge, separated from the elutriation water, is recycled to the aeration tank.

This invention relates to an aerobic process for the treatment of sewage. More particularly, it relates to an activated sludge type process which produces a dischargeable aqueous medium which is substantially free of phosphorus-containing materials. Still more particularly, it relates to an activated sludge type process wherein sludge to be recycled is subjected to treatment which eliminates at least a major portion of the soluble minerals recirculated in conventional systems.

In accordance with this invention, an aerobic sewage treatment system is provided which involves aeration and separation stages. In this system, mixed liquor is aerated and the aerated mixed liquor is separated into two phases to recover a concentrate of sludge having phosphorus material as an integral part of the sludge or merely associated therewith, which phosphorus material will hereinafter be referred to as phosphate, since this is the analytical basis for determining the presence of water-soluble phosphorus-containing material, the connotation having reference to the presence of an anion containing phosphorus when present as a component of a solution. The aeration and separation conditions should be such as to result in a sludge phase with a maximum of phosphorus material therein. The pH of the phosphate-rich sludge phase is adjusted to between about 3.5 and about 6.0 and is agitated in contact with low phosphate content aqueous medium, either a medium formed by diluting the aqueous medium associated with the sludge with a low phosphate content water or a low phosphate content water medium being supplied intermittently or continuously from an independent source, for a time sufficient to effect transfer of water-soluble phosphate material from the sludge to the aqueous medium. Phosphate enriched aqueous medium is separated from the phosphate depleted sludge and the phosphate depleted sludge is recycled in quantities to form mixed liquor of controlled solids content. The phosphate enriched aqueous medium may be disposed of by suitable means or treated to remove phosphorus-containing anions so that the aqueous medium is suitable for discharge to a receiving body of liquid, for reuse, etc.

In the conventional activated sludge systems in use today, the sewage is subjected to the usual screening, degritting, etc., operations following which the sewage is mixed with material recycled from a settling tank and subjected to aeration. The amount of recycled sludge constitutes a volume of from about 25% to 200%, based upon the volume of incoming sewage generally having a B.O.D. in the range between about 100 mg./l. and 400 mg./l.

This type of treatment, with continuous recycle of large volumes of sludge-containing liquids, creates a condition whereby equilibriums are established at relatively high levels of concentration for dissolved mineral elements such as phosphorus generally present in the form of anions, such as phosphate. Discharge of effluent daily from systems having a high mineral content, into receiving bodies, leads eventually to contamination of these bodies with the consequent results of promoting undesirable blooms, generating obnoxious odors, etc.

Most frequently, conventional activated sludge systems of sewage treatment reach equilibrium conditions favorable to accumulation in the liquid of dissolved phosphorus bearing material, in amounts such that the system discharges an effluent of relatively high phosphate content.

Heretofore, the accumulation of equilibrium amounts of phosphate in the liquid of activated sludge systems has been recognized, but since emphasis was on B.O.D. removal, a high phosphate content in the effluent was accepted as a necessary disadvantage. Consequently, steps were taken, only when serious conditions arose, such as eliminating phosphates from the plant effluent using lime, ferric chloride, and like acting chemicals.

Now it has been discovered that the buildup of phosphorus, i.e., phosphorus-containing anions, to equilibrium proportions in an activated sludge recycle system, can be prevented by utilizing a sludge, whose phosphorus-containing anion content has been depleted, for recycle and formation of mixed liquor. Treatment of this mixed liquor is for a time conducive to association of most of the phosphorus-containing anions with the sludge circulating in the aerated mixed liquor, which sludge is being maintained in the mixed liquor under aeration in concentrations considerably higher than that required for conventional B.O.D. removal and thereafter prior to return of recycle sludge for formation of mixed liquor, adjusting the pH of the sludge and agitating the pH adjusted medium in contact with an aqueous medium of low phosphate content for a period of time necessary for transfer of an appreciable portion if not substantially all, water-soluble phosphate material associated with the sludge to the aqueous medium so that a separation can be effected between phosphate rich aqueous medium and phosphate depleted sludge to be used as recycle material.

In one embodiment, the process involves mixing influent sewage with phosphate depleted sludge to form a mixed liquor, aerating the mixed liquor in an aeration treatment zone under conditions of solids concentration and time which generally will permit appreciable reversion of phosphorus containing materials, i.e., aerating for a peroid in excess of that required for transformation of phosphate-containing material to soluble phosphates in the presence of the concentration of suspended solids present, which solids concentration must be at least sufficient to catalyze B.O.D. removal and in no event, if a significant level of phosphate removal is to be attained, less than 60 pounds of suspended solids per pound of phosphate-containing material in the mixed liquor under aeration, separating this first produced sludge from the mixed liquor in a separation operation conducted under substantially aerobic conditions, discharging a sludge rich in phosphorus-containing materials to a point for suitable subsequent processing, discharging the overflow from the first separation operation to a second aeration stage where B.O.D. removal is completed and residual phosphate anion is associated in the sludge, discharging a mixed liquor from the second aeration stage to a second separation stage, separating a sludge and a substantially phosphate-free effluent for discharge from the system, combining said sludges which now generally totals a volume in the range between about 5% and 50% of the total flow entering and leaving the system, elutriating said sludge with a substantially phosphate free water solution of acid strength which will maintain the contents of the agitation zone in the pH range between about 3.5 and 6.0, separating phosphate depleted sludge and returning at least a portion thereof to the zones for aeration of mixed liquor.

More in detail, in one mode of operation, the process of treating sewage comprises mixing raw sewage, the insoluble solids of which preferably are in a comminuted form, with a substantially reduced phosphate content recycle sludge and aerating the mixture. In order to insure a length of time in this first aeration stage which would permit reversion of phosphates and their removal from the aqueous media, the first aeration operation is of such duration that B.O.D. removal will be in the range between about 45% and 75%. Return sludge is introduced into the first aeration stage generally in metered amounts dependent upon the quantity of sewage flow and the phosphate content thereof. The mixed liquor is subjected to aeration on a continuous or intermittent basis, preferably a continuous basis. B.O.D. loadings of the first aeration stage are, generally, limited loadings in the range between about 50 and 300 pounds of B.O.D. per 1000 cubic feet of aeration volume, although the loadings under some specific conditions can be higher.

The solids concentration to be maintained in the first stage of aeration of the instant process generally must exceed the solids concentration maintained in the aeration stage of conventional activated sludge systems. In general, the solids concentration to be maintained in the instant process, will be in the range between 1.5 and 5 times that of the conventional systems, which loadings for conventional systems are usually 50 to 300 pounds of B.O.D. per 1000 cubic feet of aeration volume, while variable depending upon the time of treatment, generally within the range of 2 to 6 hours, will usually be in the range between about 1000 and 3000 mg./l.

The amount of sludge solids required in a mixed liquor under aeration in order to accomplish incorporation of phosphates in a sludge to an extent such that removal of sludge from the mixed liquor will leave an aqueous medium of low phosphate content, is about 60 pounds minimum per pound of phosphorus-containing material, analyzed as phosphates, which is the form in which most of the phosphorus-containing material apparently is present after aeration of mixed liquor. This quantity of sludge solids is based upon the assumptions of the use for recycle of a substantially phosphate depleted sludge and of the substantially complete removal of phosphates from mixed liquor.

When the sludge and associated liquor being recycled to form mixed liquor contains analyzable amounts of phosphates, the amount of sludge required to tie up fresh phosphates introduced in the incoming sewage will be increased correspondingly. In other words, the phosphates in the recycle sludge medium must be taken into account in determining the total phosphite in the mixed liquor being aerated. Generally, if phosphates associated with the sludge are transferred only to the liquor associated therewith as it leaves the aeration tank, the transfer may be incomplete and the sludge, while depleted in phosphate content, will nevertheless not be devoid or substantially free of phosphate. As a consequence of the amount of phosphate in the sludge being recycled, the pounds of sludge solids per pound of phosphate in the mixed liquor in the aeration tank required to maintain the desired removal level for phosphates will necessarily be increased, i.e., be between, for example, 70 and 80 pounds.

Solids concentration in the mixed liquor in the aeration tank is a major factor both in determining time for removal of the required amounts of phosphates, for the degree of removal, i.e., 75% to 90%. As was pointed out above, 60 to 80 pounds of sludge solids per pound of phosphates, ties up the phosphates so that the sludge can be removed, for example, at the end of 1 hour, with assurance that it will have associated with it substantially all of the phosphate which the sludge solids have the ability to contain.

The time of aeration of the mixed liquor to accomplish conversion of various types of phosphates to a form removable by association with the sludge solids is directly influenced by the concentration of sludge solids present in the mixed liquor. Before phosphorus-containing material other than soluble phosphates can be removed, they must be rendered available. When the solids concentration is near the minimum of 60 pounds of suspended solids per pound of phosphorus-containing material or less, i.e., less than enough for rendering of the various forms of phosphates available that is in a period of a few seconds to a few minutes, time of aeration and the overall time for sequestering phosphates becomes an important factor. If the suspended solids of the mixed liquor is more than enough for quick conversion of the phosphates, it becomes a minor factor, for example, if the solids concentration is near the minimum of 60 pounds of suspended solids per pound of phosphates, 94% of the phosphates will be rendered available in about 4 hours of aeration and, therefore, substantially complete removal can be completed in a time in slight excess thereof, i.e., 5 hours. If the solids concentration is appreciably higher, for example, 100 pounds of suspended solids, per pound of phosphates, 95% of the phosphates can be rendered available in about 40 minutes and, therefore, substantially complete removal can be completed in about 1 hour. If the solids concentration is of the order of 150 to 170 pounds of suspended solids per pound of phosphate, 95% of the phosphates can be rendered available in about 10 minutes and, therefore, the removal can be substantially completed in about a half hour. In general, the solids concentration in the mixed liquor will be in the range between 60 and 250 pounds per pound of phosphate present when operating for maximum phosphate removal.

When the solids content of the mixed liquor under aeration is less than the minimum of about 60 pounds per pound of phosphate present, the phosphate removal falls in proportion to the ratio that the pounds of solids present per pound of phosphate bears to the minimum of 60 pounds of sludge solids per pound of phosphate.

While we do not wish to be bound by theory, it appears that only a small part of the total phosphorus-containing material present in the mixed liquor is in the form of soluble phosphates initially, but appear in a form, analyzable as phosphate anion following aeration, which can be removed by the sludge solids. To illustrate, when a sewage having 90 mg./l. of phosphorus-containing material, analyzed as phosphate is being introduced continuously into an aeration tank and a sludge solids concentration of 3000 mg./l. is being maintained, only about 80% of total phosphorus bearing material, measured as phosphate, will be removed in a 24 hour aeration period.

If the solids conceneration is increased to 4500 mg./l., about 80% removal can be attained in 4 hours and 99% removal can be attained in 24 hours. If the solids concentration is increased to about 7200 mg./l., 97% removal is attained in 1 hour. In other words, to accomplish phosphorus-containing material conversion and 80% removal requires a minimum of about 3000 mg./l. in the mixed liquor when holding sewage under aeration for 24 hours, about 4500 mg./l. when holding the same sewage under aeration for 4 hours, about 5500 mg./l. when holding the same sewage 1 hour and about 6000 mg./l. when holding the same sewage for about 30 minutes.

To treat the same sewage for 98% phosphate removal requires a minimum of about 4500 mg./l. for 24 hours aeration and about 7500 mg./l. for 1 hour aeration. While the preferred range of solids content in the first aeration stage seeking about 90% phosphate removal may be 3500 to 6500 mg./l., depending upon the aeration period, solids concentrations outside this range may be dictated by the wide variation in flow of incoming sewage received into the first aeration tank on an hourly basis, and because removal of phosphate is dependent on adequate treatment resulting from solids-liquid contact. As flow increases, average retention time of phosphatic material in the first aeration tank is reduced, which may be compensated for by increasing the solids concentration in the first aeration tank. Contrawise as flow decreases, retention time in the first aeration tank is longer, and to compensate, the solids concentration may be reduced. Consequently, inasmuch as the first stage of aeration is to be operated for maximum phosphate removal, a combination of flow measuring devices with solids measuring devices may be utilized to maintain control of the solids concentration and to maintain an optimum level of solids relative to the time that the liquid would be under aeration in the first aeration stage as determined by the throughput rate.

One of the primary problems in control of a system operating in accordance with this invention is the maintenance of a proper ratio of sludge solids to phosphate, when the influent sewage is subject to considerable variation due to change in phosphate content or due to change in influent sewage flow rate. When the aeration tank is operating with a sludge solids loading in the mixed liquor which is near the minimum for a phosphate loading of, for example, 25 mg./l., the phosphate loading due to change in phosphate content or flow of influent sewage can double in as short a time as a half hour or less. When this happens and the amount of sludge solids present per pound of phosphate consequently drops below the minimum requirement, phosphate removal will be limited to that proportion of the total which the sludge can associate with it and the balance will be found in the effluent when the mixed liquor is separated into effluent and sludge components, unless a compensating increase in the flow of phosphate depleted sludge from a reaeration holding tank is induced.

Following treatment in the first aeration operation, a mixed liquor containing a phosphate-rich sludge is discharged to a separator. This transfer may be on a periodic or a continuous basis. In this separator, a sludge having the major portion of the phosphate anions associated with it, is separated from an aqueous medium which is discharged over a weir or other equivalent means. This aqueous medium has an appreciable content of material representing unsatisfied B.O.D., and some dissolved phosphate content, and may carry in suspension some unsettled solids. The B.O.D. content of this aqueous medium usually may be in the range between about 25% and 50% of the B.O.D. demand being introduced into the system. The dissolved phosphate content plus that associated with the sludge generally constitutes between 5% and 25% of the total phosphate of the mixed liquor of the first aerator stage.

Separation operations are conducted for the purpose of segregating a maximum of phosphate enriched sludge in an operationally practical length of time. It is preferred to conduct the separation in a high rate separator so as to accumulate a maximum amount of sludge in a minimum amount of time and to limit the residence time in the separator. Minimum residence time in the separator will vary with the type of separator and it is preferred that apparatus be used which limits residence time to a period not to exceed an hour and usually to about 30 minutes or less. Segregation of sludge as soon as appropriate solids concentrations are attained in the separator, may be accomplished by appropriate means such as airlifts operating in various types of hopper bottoms and equivalent apparatus.

Inasmuch as the liquid effluent from separation operation may contain appreciable amounts of phosphate, due to the fact that the phosphate content of the mixed liquor may vary faster than the sludge concentration can be adjusted and appreciable quantities of unsatisfied B.O.D., due to too short a period of aeration, it is preferred to utilize two aeration and separation stages.

In addition, the second aeration stage provides treatment time for further reducing the B.O.D. and phosphate contents to acceptable levels without requiring excessively high solids concentration in the first stage.

Liquor separated in the first settling operation is delivered to a second aeration stage where it is mixed with a phosphate depleted recycle sludge. When aeration is carried out in the presence of proper levels of concentration of solids, elimination of the still unsatisfied B.O.D. occurs simultaneously with tying up of the soluble phosphates carried through in the effluent from the first separation stage.

The solids concentration carried in a second aeration stage of the embodiment of the system discussed may be considerably less than that in the first aeration stage.

Phosphate content of the influent liquor to the second aeration stage will be a major factor in determining the concentration of solids required to be carried for effective reduction of the phosphate content of the plant effluent to the desired levels. In general, if, for example, between 80% and 90% of the phosphate is associated with the sludge of the first separation stage, the solids content in the second aeration stage can be reduced proportionally to provide the same approximate ratio of phosphate to sludge solids as in the first aeration stage. Cognizance must be taken of the fact that such a reduction in solids content may be so drastic as to adversely affect the B.O.D. removal and, consequently, solids contents greater than indicated on the basis of phosphate removal requirements may be used.

A proper level of solids concentration in mg./l. in this second aeration stage mixed liquor, dictated by the phosphate content, may be in the range between 500 and 3000 mg./l., but in no event less than about 500 mg./l.

In general, it is preferred to utilize for B.O.D. treatment, a solids concentration in the second aeration stage in the range between about 1000 mg./l. and 3000 mg./l.

Air is introduced into the second stage of aeration in quantities and for a time necessary to attain substantially complete B.O.D. removal. In general, it is preferred to operate in this second stage of aeration with B.O.D. loadings in the range between 35 and 150 pounds of B.O.D. per day per 1000 cubic feet of mixed liquor under aeration.

Mixed liquor is withdrawn continuously or intermittently from the second aeration stage. The mixed liquor is separated into an aqueous effluent low in phosphate and a sludge enriched with phosphate. While time for separation of the sludge is not a critical factor, accumulated sludge must not be held so long that phosphate reenters the effluent phase. A minimum practical retention time is usually about 30 minutes and the maximum time for sludge to be retained in the separation stage is about 3 to 4 hours, unless precautions are taken, such as agitation and aeration.

Segregated sludges can be dealt with individually or collectively. For example, a portion of the uncirculated or collective sludges can be discharged to waste prior to treatment to create a phosphate depleted sludge. Generally, the combined sludges are delivered to an elutriation tank where the sludge is agitated during a period generally of 30 minutes to 1 hour. Water of low phosphate content and acid are added to the sludge in the elutriation tank. The quantity of acid added is that necessary to maintain a pH in the range between about 3.5 and 6.0. Release of phosphates associated with the sludge into a low phosphate content aqueous medium is accomplished in a period of 30 minutes to 1 hour.

The process herein described is related to two other processes for producing a low phosphate content effluent, which are described in applications of one of the above-named inventor Tom H. Forrest, identified as Ser. No. 458,689, filed May 25, 1965, and entitled "Process for Treatment of Sewage and Nutrient Removal," and the other identified as Ser. No. 547,495, filed May 4, 1966 and entitled "Sewage Treatment Process."

When the contents of the elutriation tank are agitated to avoid sedimentation and preferably to disintegrate sludge agglomerates for an appropriate period of at least 30 minutes to 1 hour, phosphates associated with the solids are transferred in appreciable quantities to the liquid medium in contact therewith.

Contents of this elutriation tank are discharged continuously or intermittently to a settling tank for separation of a phosphorus-rich liquor by decantation, flow over a weir or other suitable liquid solids separating operations. In the settling tank, the volume of phosphorus-rich liquor produced constitutes between about 5% and 20% of the volume of incoming sewage. To avoid discharging a liquor with a high phosphorus content to a receiving stream and to prepare a low phosphate content water for recycle to the elutriation operation, the phosphate-rich elutriate is mixed with lime which precipitates a mixture of calcium phosphate and calcium sulphate. To accomplish this result, sufficient lime is added to produce in the solution in the flocculating tank, a pH in the range between 10 and 11.5, preferably about 11. After elutriation and liquid-solids separation, the phosphate depleted sludge is stored for a period of time prior to being mixed with incoming sewage. By doing this a reserve of conditioned sludge is maintained for use in periods of high phosphate content sewage or increased sewage flows. It must be borne in mind, that sludge to be used as seed material should not be held under anaerobic conditions for more than about 4 hours.

The invention will be further understood from the schematic flow sheets in which:

FIGURE 1 illustrates a treatment system involving only one aeration stage and one sludge separation stage, and FIGURE 2 illustrates a treatment system involving multiple stages of aeration and separation.

Referring to FIGURE 1, raw sewage enters a primary sedimentation tank 10 through a conduit 11. Settled solids are discharged from sedimentation tank 10 through pipe 12 to a suitable processing unit here labeled vacuum filtration and incineration. Liquor and suspended solids are discharged through pipe 13 into an aeration tank 14.

Air is introduced into tank 14 by dispersers 15 supported by their communication piping with a header 16 which delivers air from a source under pressure not shown. Mixed liquor after treatment in tank 14 flows through a conduit 17 to a separation tank 18.

Separation tank 18 is provided with a sump 19 and an overflow weir 20. A pump 21 of the conventional airlift type is provided to withdraw settled sludge.

Liquor overflowing weir 20 is a low phosphate content effluent and is discharged from the system. Sludge removed from sump 19 of separation tank 18 is delivered by a conduit 22, pump 23 and pump discharge conduit 24 to an elutriation tank 25. Sludge in conduit 24 may be diverted to waste through pipe 26.

Low phosphate content water is introduced in elutriation tank 25 through pipe 27. This water may be water from an external source of from an internal source as hereinafter described. An acid such as sulfuric acid, in quantities to produce a pH in the contents of tank 25 of between 3.5 and 6, is introduced through pipe 28 from a source not shown, here illustrated as being combined with the water being introduced into tank 25.

Tank 25 is provided with suitable agitator means 29 and sludge after a suitable period of agitation in the tank overflows a weir 30 as a suspension and is delivered by conduit 31 into a settling tank 32.

Settling tank 32 is provided with an overflow weir 33 and a sump 34. Sludge removed from sump 34 by pump 35 is delivered as recycle material through conduit 36 to pipe 13 for introduction into aeration tank 14. Alternatively, a portion of the treated sludge may be diverted to waste.

Liquid overflowing weir 33 is delivered by conduit 37 to a mixing tank 38. Lime is added to the contents of tank 38 through pipe 39 from a source not shown in quantities to adjust the pH to about 11 whereby insoluble phosphates are formed. A suspension of solids is discharged from tank 38 through pipe 40 to a sedimentation tank 41.

Solids settled in sedimentation tank 41 are discharged through pipe 42 to pipe 12 where they are combined with primary sludge requiring processing.

Aqueous medium overflowing a weir 43 in tank 41 is a low phosphate content water. This water may be discharged from the system through conduit 44 or a portion thereof may be recycled through pipe 45 to elutriation tank 25 or a portion thereof may be introduced through pipe 46 into conduit 36 in quantities designed to reduce the acidity of the recycle sludge to approximate neutrality, or any suitable combination thereof.

Referring now to FIGURE 2, there is illustrated a system designed for more complete phosphate removal from the effluent and a more thorough depletion of the phosphate from the recycle sludge.

In the embodiment of the process illustrated in FIGURE 2, comminuted sewage enters a primary aeration tank 50 through a conduit 51. Air is introduced into tank 50 by dispersers 52 supported by their communication piping with a header 53 which delivers air from a source under pressure not shown. Mixed liquor flows from tank 50 to a first separation tank 54 through conduit 55.

Separation tank 54 is provided with a sump 56 and an overflow weir 57. A pump 58 is provided to withdraw settled sludge. Sludge removed from tank 54 through conduit 58a is delivered by pump 58 and pump discharge conduit 70 to a combined sludge conduit 71 the purpose of which to be explained later.

Liquor overflowing weir 57 is delivered to the second aeration tank 60 through a pipe 59. Air is delivered into tank 60 by dispersers 61 supported by their communication pipe with a header 62 which delivers aid under pressure from a source not shown.

Mixed liquor is delivered from tank 60 to a second separation tank 63 through conduit 64. Second separation tank 63 is provided with a sump 65 and an overflow weir 66. A pump 67 of the conventional airlift type is provided to withdraw sludge from sump 65, although other equivalent means may also be used.

Sludge removed from tank 63 is delivered by a conduit 68 and a pump 69 to a sludge conduit 71. Combined sludge in pipe 71 may be diverted to waste through conduit 75. Flow in conduit 75 is controlled by valve 76 and in pipe 71 by valve 77.

Sludge passing valve 76 is delivered to a mixing tank 78 provided with a suitable agitator 79. Substantially phosphate free water is introduced into the mixing tank 78 through pipe 80. An acid such as sulfuric acid, in quantities to produce a pH in the contents of tank 78 of between 3.5 and 6, is introduced through pipe 81 from a source not shown. Sludge, after suitable residence time in the tank 78, overflows a weir 82 as a suspension and is delivered by conduit 83 into a settling tank 84.

Settling tank 84 is provided with an overflow weir 85 and a sump 86.

Sludge is removed from sump 86 by pump 87 and is delivered to a stream splitter 88 where predetermined volumes of sludge can be directed to waste through conduit 89 or to recycle conduit 90, or any appropriate combination thereof.

Liquid overflowing the weir 85 is delivered by conduit 91 to a mixing tank 92. Lime is added to the contents of the tank 92 through pipe 93 from a source not shown in quantities to adjust the pH of the contents of the tank to about 11 whereby insoluble phosphates are formed. A suspension of solids is discharged from tank 92 through pipe 94 to a sedimentation tank 95.

Solids settled in sedimentation tank 95 are discharged through pipe 96 to waste or combined with other materials such as primary sludge which require additional processing such as vacuum filtration and incineration.

Aqueous medium overflowing a weir 97 in tank 95 is a low phosphate content water. This water may be discharged from the system through pipe 98 or any portion of the whole thereof may be recycled through pipe 80 to elutriation tank 78 or a portion thereof may be introduced through pipes 99 and 100 into a conduit 90 in quantities designed to reduce the acidity of the recycled sludge to approximate neutrality. Sludge segregated for recycle, passing through conduit 90 is moved by pump 101 through conduit 102 to tank 103 where air is dispersed therein by dispersers 104. Chemicals for adjustment of pH necessary to bring the sludge to approximate neutrality, such as caustic solution, is introduced into tank 103 through pipe 105 from a source not shown.

Reactivated sludge removed from tank 103 by suitable means such as an airlift is delivered through conduit 106 to a stream splitter 107 where predetermined volumes of sludge can be directed to aeration tank 50 through conduit 108 and to aeration tank 60 through conduit 109.

In an alternative embodiment of the invention, advantageous when the phosphate content of the sludge is high, sludge being delivered by pump 87 is diverted through conduit 110 to a second elutriation tank 111. Low phosphate content water is delivered through pipe 99 to the tank 111 and acid, such as sulfuric acid, is introduced into this tank, if required to maintain a pH of between 3.5 and 6 through pipe 112.

Tank 111 is provided with suitable agitator means 113 and sludge after a suitable period of agitation overflow a weir 114 as a suspension and is delivered by a conduit 115 into a settling tank 116.

Settling tank 116 is provided with an overflow weir 117 and a sump 118. Sludge removed from sump 118 by pump 119 is delivered to pipe 90 for passage to the reaeration tank 103. Liquid overflowing the weir 117 is conveyed by pipe 120 to conduit 91 where it is combined with the phosphate-rich liquor from the first elutriation operation.

Sewage having a phosphorus-containing material content, analyzed as phosphate, of 30 ml./l. and a B.O.D. of 200 mg./l. could produce under optimum conditions in the process illustrated in FIGURE 1 an effluent in a 4 hour aeration time containing 3 mg./l. of phosphate when maintaining a sludge solids concentration of 3700 mg./l. in the aeration tank 14 and a phosphate-enriched sludge containing approximately 27 mg./l. of the initial phosphate material.

Phosphate-rich sludge of approximately 8400 mg./l. concentration in a volume of medium which is one-fifth of the influent sewage volume, when adjusted to pH 5 with sulfuric acid and elutriated with two volumes of water per volume of sludge, the water having a phosphate content of 0.5 mg./l. will produce a phosphate-rich aqueous medium containing 12 mg./l. of phosphate and a phosphate depleted recycle sludge whose total phosphate has been reduced by 36 mg./l.

When the phosphate-rich aqueous medium is reacted with lime at pH 11, a low phosphate content water containing 0.5 mg./l. of phosphate is obtained.

If the influent sewage containing 30 mg./l. of phosphorus-containing material and 200 mg./l. of B.O.D. is treated in accordance with the process illustrated in FIGURE 2, the aqueous medium discharged from the first separation zone when operating the first aeration tank with 6000 mg./l. of sludge solids and a 1 hour aeration period may have a phosphate content of 5 mg./l. and a B.O.D. of 100 mg./l. The sludge discharged from separation tank 54 may have an additional phosphate content of 25 mg./l.

After aeration of the aqueous medium in tank 60 for 2 hours while maintaining a sludge solids concentration of 3000 mg./l. and separation of the mixed liquor in separation tank 63, an effluent can be produced having a phosphate content of 0.5 mg./l. and a B.O.D content of 18 mg./l.

The combined sludges totaling 30% of the influent flow contain 29.5 mg./l. of the initial phosphate. The combined sludge, when adjusted to a pH of 5 and elutriated with two volumes of water containing 0.5 mg./l. of phosphate delivered through pipe 80, will produce a phosphate-rich aqueous medium containing 9.8 mg./l. and a phosphate depleted recycle sludge.

The above-detailed description of this invention has been given by way of illustration without any intention that the invention be limited to the exact conditions set forth. No unnecessary limitations should be understood therefrom as modifications will be obvious to those skilled in the art.

We claim:

1. In an aerobic sewage treatment process adapted to accept a phosphorus-containing influent sewage and to discharge a substantially phosphate free aqueous effluent, said process involving aeration and sludge separation stages, the steps comprising continuously commingling phosphorus-containing influent sewage with phosphate-depleted sludge in a holding zone to form a mixed liquor, aerating mixed liquor formed by commingling phosphorus-containing influent sewage with phosphate depleted recycle sludge for a period in excess of that required for transformation of phosphorus-containing material to removable phosphates in the presence of the concentration of suspended sludge-solids present, said mixed liquor having a minimum suspended sludge-solids concentration at least sufficient to catalyze B.O.D. removal and in no event less than 60 pounds of suspended solids per pound of phosphate-containing material introduced into the mixed liquor under aeration, with drawing aerated mixed liquor, separating said aerated mixed liquor into a low suspended solids content aqueous medium phase of relatively low phosphate content and a phase comprising sludge rich in phosphorus-containing material, concentrated in low phosphate content aqueous medium, maintaining the pH of the sludge between about 3.5 and about 6 during agitation in contact with low phosphate content aqueous medium for a period of time effecting transfer of an appreciable portion of water-soluble phosphate associated with the sludge to said aqueous medium, separating phosphate enriched aqueous medium from phosphate depleted slude and recycling said phosphate depleted sludge for formation of mixed liquor in the aeration zone.

2. The process according to claim 1 wherein the suspended solids concentration in the mixed liquor is between 60 pounds and 250 pounds per pound of phosphorus-containing material present.

3. The process according to claim 1 wherein the phosphate-rich sludge is eluted with from 1 to 4 volumes of low phosphate content water per volume of sludge for a period of from 1 to 6 hours before recycle of the phosphate depleted sludge.

4. The process according to claim 1 which includes the additional step of contacting said phosphate-rich aqueous medium with chemically reactive agents whereby phosphate ion is removed from solution.

5. The process according to claim 1 wherein at least a portion of the phosphate depleted sludge is reaerated in a holding zone whereby a quantity of sludge is maintained available for discharge into the mixed liquor to compensate for fluctuations in phosphate content of the mixed liquor under aeration.

6. The process according to claim 1 wherein recycle sludge after elutriation is adjusted in pH back to substantial neutrality.

7. In a sewage treatment process adapted to accept a phosphate-containing influent sewage and to discharge a substantially phosphate free aqueous effluent, the steps comprising introducing sewage having phosphorus-containing material as one component thereof and an unsatisfied B.O.D. into a system for a sequential liquid flow arrangement of a first aeration zone, a first sludge separation zone, a second aeration zone for treatment of liquor discharged from said first sludge separation zone and a second separation zone, said first aeration zone holding a mixed liquor formed of phosphate depleted recycle sludge and said sewage, aerating said mixed liquor for a period in excess of that required for transformation of phosphorus-contatining material into removable phosphates in the presence of the concentration of suspended solids present, said mixed liquor having a minimum suspended sludge-solids concentration at least sufficient to catalyze B.O.D. removal and in no event less than 60 pounds of suspended solids per pound of phosphorus-containing material in the mixed liquor under aeration, withdrawing aerated mixed liquor from said first aeration zone to a first separation zone where the time of concentration is a maximum of about 1 hour, removing a phosphate-rich sludge from said first separation zone, separately discharging an aqueous medium from said first separation zone, mixing aqueous medium discharged from said first separation stage with phosphate depleted recycle sludge to form a second body of mixed liquor for treatment in a second aeration zone having at least 500 mg./l. of suspended sludge-solids and in no event less than 60 pounds of suspended sludge-solids per pound of phosphorus-containing material present, introducing air into said second body of mixed liquor in quantities to effectuate completion of the B.O.D. removal, discharging mixed liquor from said second body to a second separation zone, separating an effluent for discharge from the system, recovering sludge from said second separation zone, combining the phosphate rich sludge from said first separation zone and the sludge recovered from said second separation zone and aqueous mediums associated therewith, eluting said combined sludges with low phosphate content water and maintaining the pH thereof between about 3.5 and about 6 during agitation in a mixing zone for a period in the range between about one-half hour and about 1 hour whereby phosphate associated with said sludge is transferred to the aqueous medium, withdrawing treated suspension from said mixing zone to a separation zone, discharging a phosphate-rich liquor from said separation zone and recirculating the phosphate depleted sludge and its associated liquid to said aeration zones.

8. The process according to claim 7 wherein the elutriation is carried out in two elutriation operations in sequence prior to recycle to the aeration zones.

9. The process according to claim 7 in which said mixed liquors have a suspended solids concentration of between 80 to 150 pounds of suspended sludge-solids per pound of phosphorus-containing material in the mixed liquor under aeration.

10. The process according to claim 7 wherein the phosphate-rich aqueous medium obtained through elutriation of the sludge is treated with lime to precipitate phosphates and the resultant low phosphate content aqueous medium is recycled to the elutriation operations.

References Cited

UNITED STATES PATENTS 3,236,766   2/1966   Levin _____ 210—6

OTHER REFERENCES

Feng, T. H.: Phosphorus and the Activated Sludge Process, Water and Sewage Works, November 1962, vol. 109, pp. 431–436.

MICHAEL E. ROGERS, *Primary Examiner.*